United States Patent

Pfefer

[11] 4,107,716
[45] Aug. 15, 1978

[54] DEMOUNTABLE PHOTO VIGNETTING DEVICE

[76] Inventor: Irving Pfefer, 637 Anson St., Simi Valley, Calif. 93065

[21] Appl. No.: 681,532

[22] Filed: Apr. 29, 1976

[51] Int. Cl.² ............................................. G03B 11/00
[52] U.S. Cl. .................................... 354/296; 354/295; 354/122
[58] Field of Search ...................... 354/122, 295, 296; 355/40, 75

[56] References Cited

U.S. PATENT DOCUMENTS

| 369,453 | 9/1887 | Kuhn | 354/296 |
|---|---|---|---|
| 581,279 | 4/1897 | Gray | 354/296 |
| 714,334 | 11/1902 | Schoonover | 354/296 |
| 1,118,640 | 11/1914 | Dreyfoos | 354/296 |
| 1,743,841 | 1/1930 | Zurovsky | 354/296 |
| 1,991,814 | 2/1935 | Mitchell | 354/296 |
| 2,641,952 | 6/1953 | Mellert | 354/296 |
| 2,664,781 | 1/1954 | Waller | 354/296 |
| 3,604,328 | 9/1971 | Nakagawa | 354/296 |
| 3,940,775 | 2/1976 | Bodnar | 354/122 |

Primary Examiner—L. T. Hix
Assistant Examiner—Alan Mathews
Attorney, Agent, or Firm—Mahoney, Schick & Cislo

[57] ABSTRACT

A demountable, readily portable photo vignetting kit includes a mounting plate for securement of the assembled kit to the lens mount of a camera and track means on said mounting plate for moveably orienting a vignetting screen standard to permit various photographic effects to be achieved during the taking of a photograph.

7 Claims, 9 Drawing Figures

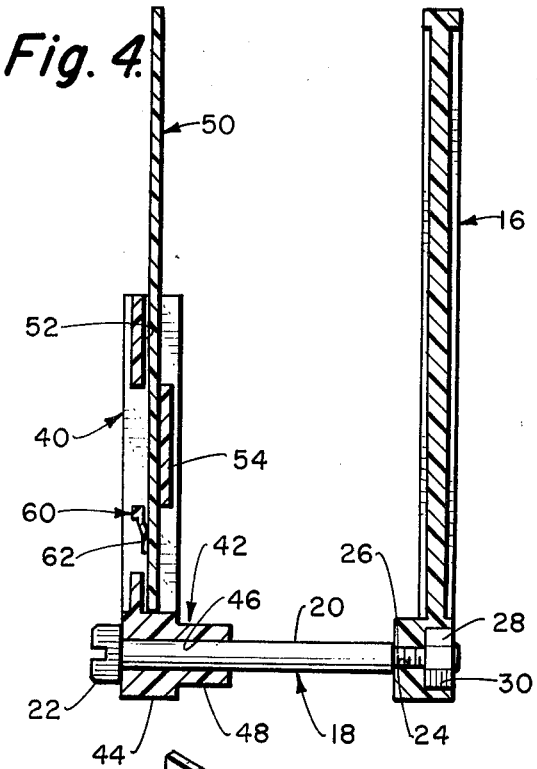
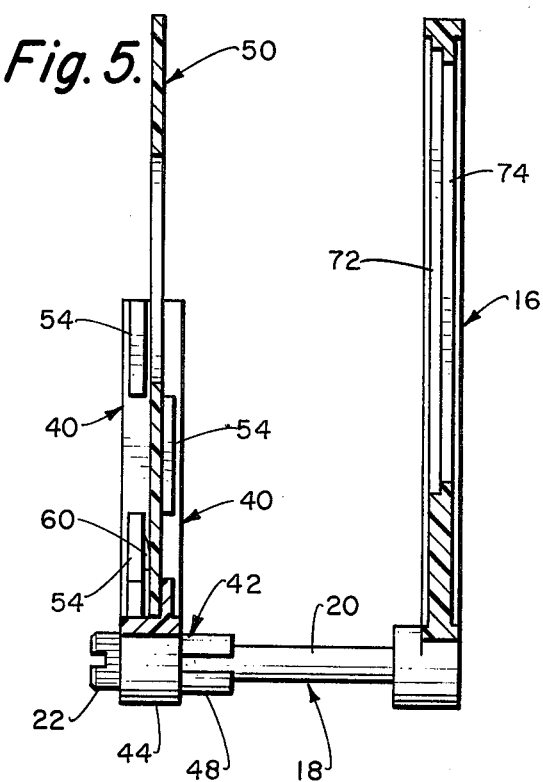
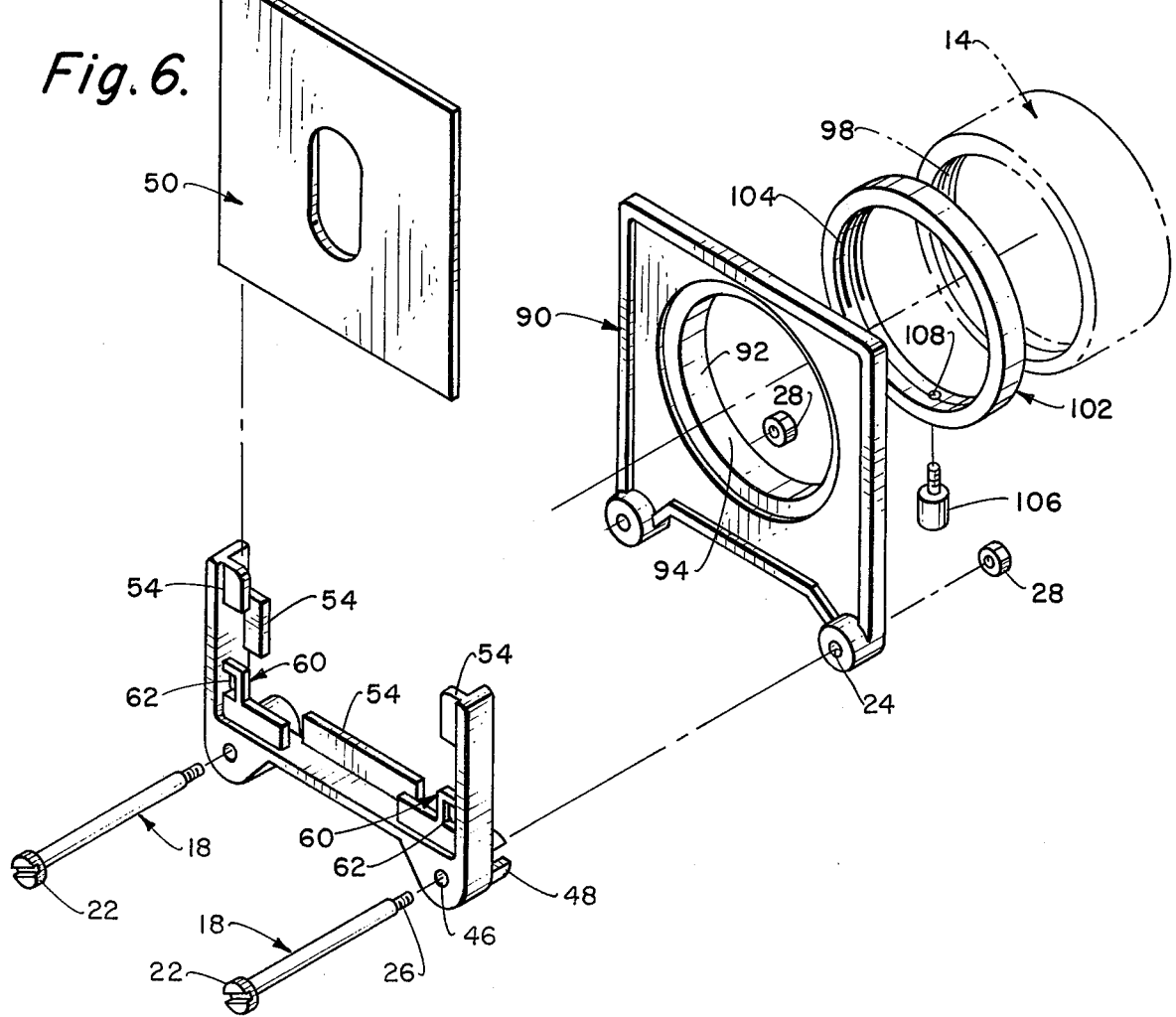

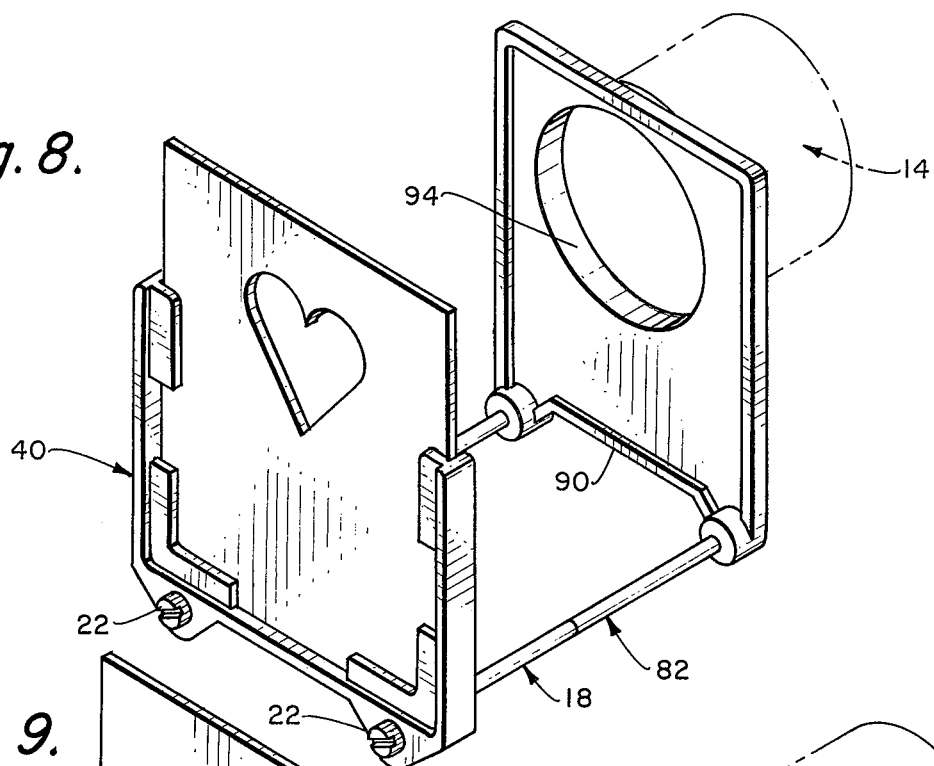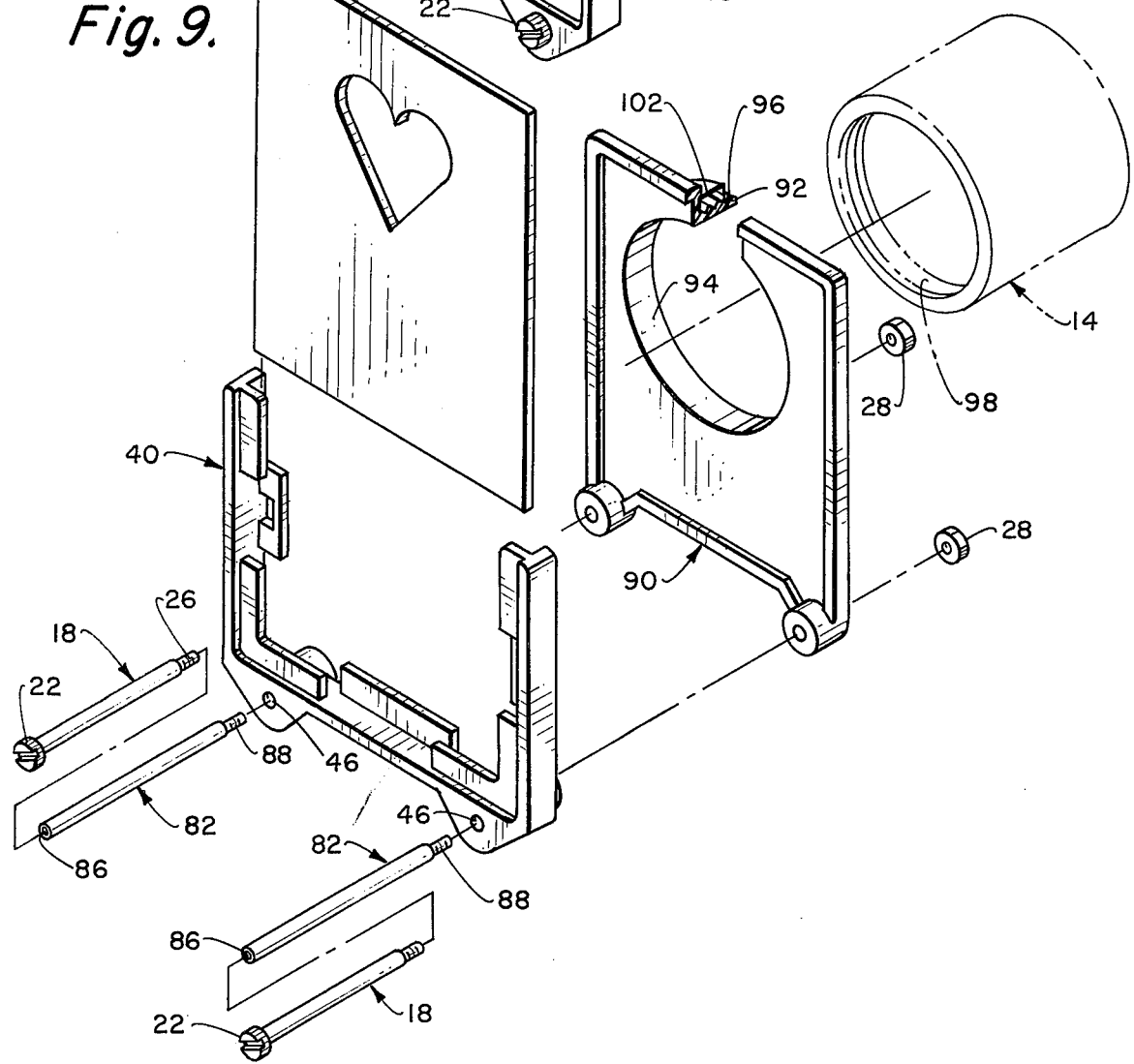

DEMOUNTABLE PHOTO VIGNETTING DEVICE

BACKGROUND OF THE INVENTION

In the prior art practices, it is customary to accomplish the creation of special printing effects, such as vignetting, during the printing of a photograph. Consequently, the use of such techniques has previously been confined to the darkroom and control of vignetting and similar processes and their accomplishment in the field during the taking of a photograph has not been possible.

Furthermore, many amateur photographers do not have available to them the darkroom equipment which permits them to embellish the photographs they have taken in various artistic ways during the printing of the negatives of such photographs.

Consequently, the use of artistic techniques such as vignetting, silhouetting, halo effects and others has been largely restricted to professionals and the amateur photographer has not been able to resort to these techniques which, on occasion, materially enhance the beauty and impact of a photographic print.

Other darkroom techniques available to the professional or well-equipped amateur include the utilization of specially shaped vignettes including crosses, stars, diamonds and various other symbolic shapes to frame a photographic image as it is printed from the photographic negative. Because of the equipment entailed and the fact that most amateurs do not have their own darkroom, they have been precluded from the achievement of such special effects.

BACKGROUND AND SUMMARY OF THE INVENTION

It is, therefore, a primary object of my invention to provide a vignetting device which is embodied in a demountable kit, said kit, when assembled, being securable to the lens mount of a camera and incorporating components which facilitate the utilization of vignetting and other types of optical screens so that an amateur or professional photographer may utilize the sophisticated framing and vignetting techniques in the field while the photograph is being taken thus achieving a spontaneity of effect which greatly enhances the beauty of the photograph and which, in addition, permits immediate perception of the results which will be achieved in the ultimate prints made from the negative.

Where prior art techniques are utilized, a pre-existing photograph is subjected to the various vignetting or framing processes and the operator is confined to the use of previously taken images. Consequently, he may discover that the use of an intended frame or the use of a diffusing screen or vignetting screen is not in accord with the general outlines of the image on the negative. This problem is eliminated completely by the use of the vignetting device of my invention since the operator of the camera is immediately able to ascertain the conformity of the screen to the image being taken.

Another object of my invention is the provision of a demountable, portable photo-vignetting device which includes a mounting plate adapted to be secured in operative relationship with the lens mount of a camera, track means demountably secured to said mounting plate and a screen receiving standard slideably mounted on said track means so that it can be disposed in a plurality of pre-selected positions in respect to said lens mount and the lens incorporated therein.

A further object of the invention is the provision of a demountable, portable photo-vignetting device wherein the mounting plate is secured in operative relationship with the aforesaid lens mount by means of a conventional lens ring inserted through a centrally located opening in said mounting plate and engageable with corresponding threads on the lens mount.

A further object of my invention is the provision of a device of the aforementioned character wherein the mounting plate includes securement means thereupon engageable with the lens mount of the camera, thus eliminating the necessity for the utilization of the conventional lens ring.

An additional object of my invention is the provision of a device of the aforementioned character wherein the securement means provided on the mounting plate is also provided with a locking ring adapted to prevent displacement of the mounting plate from operative relationship with the lens mount.

An additional object of my invention is the provision, in a device of the aforementioned character, of track retainer means on said mounting plate which facilitates the demountable association of said track means with said mounting plate and permits said track means to be readily associated therewith.

An additional object of my invention is the provision on the aforesaid screen standard of frictional engagement means adapted to securely and positively engage said track means and to maintain said screen standard in a pre-selected position on said track means.

Another object of my invention is the provision in a device of the aforementioned character of a screen standard having screen receptacle means thereupon to permit the temporary insertion therein of a selected screen.

Another object of my invention is the provision, in association with said receptacle means of said screen standard, of retention means adapted to retain a screen mounted in said receptacle means against inadvertent displacement from said receptacle means.

Other objects and advantages of the invention will be apparent from the following specification and the accompanying drawings.

BRIEF DESCRIPTION OF THE DRAWINGS

FIG. 4 is a vertical, sectional view taken along the broken line 4—4 of FIG. 2;

FIG. 5 is a vertical sectional view taken on the broken line 5—5 of FIG. 2;

FIG. 6 is an exploded view showing the demountable components of an alternative embodiment of the device of the invention;

FIG. 8 is an assembled view of the components shown in FIG. 6; and

FIG. 9 is a disassembled view of the same components showing the incorporation therewith of the track extender means.

DESCRIPTION OF PREFERRED EMBODIMENTS OF THE INVENTION

Figure 1:
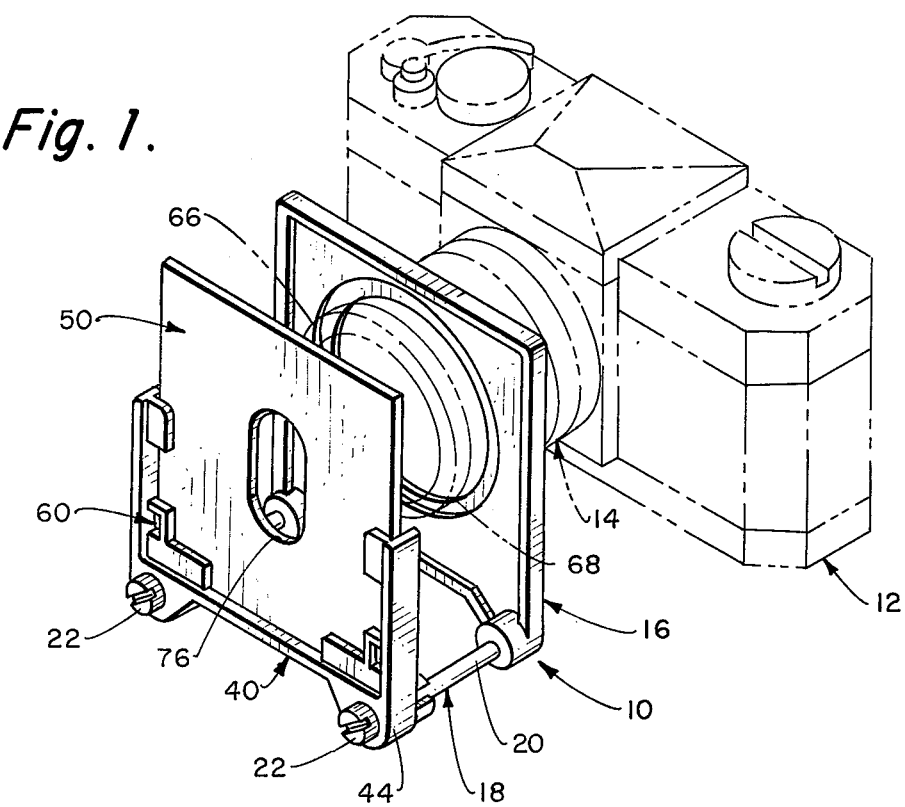
FIG. 1 is a view showing an embodiment of the demountable photo-vignetting device secured in operative relationship with the lens mount of a camera.
Figure 2:
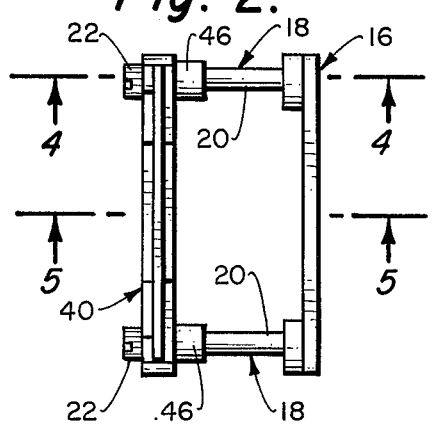
FIG. 2 is a top plan view of the assembled device of FIG. 1.

Referring to the drawings, and particularly to FIGS. 1-5 thereof, I show a portable, demountable vignetting device 10 adapted to be utilized in conjunction with a conventional camera 12, FIG. 1, by being secured in operative relationship with the lens mount 14 of said camera. As is well known to those skilled in the art, conventional lens mounts incorporate a thread positioned externally of the lens to facilitate the utilization of various types of filters or protective lenses in conjunction with the lens supported in the lens mount.

The device 10 includes a mounting plate 16 which may be fabricated by the injection molding process from any one of a number of suitable thermosetting resins or which may be fabricated by the die-casting process if desired. The mode of fabrication of the mounting plate and the material utilized in such fabrication are not material to the performance and construction of the mounting plate except that, of course, the materials used should be relatively light so that the weight of the mounting plate does not constitute a substantial additional load imposed upon the lens mount 14.

Demountably associated with the mounting plate 16 is track means 18, said track means being constituted by elongated cylindrical rods 20 having slotted heads 22 on the forward extremities thereof and threaded inner extremities 24 insertable through a corresponding orifice 26 in the mounting plate 16, FIG. 4, and engageable with a correspondingly threaded track retainer nut 28 located in a retainer recess 30 provided in the back wall and lower edge of the mounting plate 16.

Although the track means is disclosed as consisting of elongated rods 20 of cylindrical configuration, it will be obvious to those skilled in the art that track means of a wide variety of configurations can be substituted for the rods 20 and suitably associated with the mounting plate 16 in a demountable relationship.

Mounted for longitudinal movement on the track means 18 is a vignetting screen standard 40, said standard, FIGS. 4-5, being fabricated from similar materials and by similar processes to those utilized in fabricating the mounting plate 16. The standard 40 is demountably associated with the track means 20 by means of track engaging members 42, said track engaging means being constituted by integral bosses 44 on the screen standard 40 and incorporating elongated bores 46 for the slideable reception of the track means 18.

Incorporated in the track engaging means 42 are bifurcated, frictionally engaging fingers 48 which securely engage the associated perimeter of the track means 18 to maintain the screen standard in a predetermined location on the track means 18 while permitting movement of said screen standard 40 along said track means 18 when it is desired to alter the spatial relationship between the lens of the camera and the screen 50 mounted in the screen standard 40.

Receptacle means 52 constituted by a plurality of integral, spaced lugs 54 on the mounting standard 40 is incorporated in the screen standard 40 for slideably receiving a selected screen 50 to permit the screen 50 to be utilized during the taking of photographs to achieve a predetermined vignetting or artistic effect during the taking of the photograph.

In order to prevent the inadvertent displacement of the selected screen 50 from operative engagement in the receptacle means 52, retainer means 60 is associated with said receptacle and, as best shown in FIG. 4 of the drawings, includes an integral prestressed retainer finger 62 located adjacent the receptacle means 52 and engageable with the lower perimeter of a selected screen 50 to maintain the screen 50 in operative engagement with receptacle means 52 despite the orientation of the photo vignetting device 10 with respect to the associated camera 12.

The fingers 62 are formed integrally with the plastic material of the screen standard during the injection molding process and are pre-stressed to cause them to be biased into engagement with the adjacent surface of the screen 50. Similar prestressing of the bifurcations 48 of the track engagement means 42 results in the frictional pressure exerted thereby on the perimeter of the track means 18.

In order to secure the photo vignetting device 10 in operative relationship with the lens mount 14 a conventional lens ring 66 is utilized said lens ring having a radial flange 68 and being provided with a male thread, not shown, receivable in corresponding female thread, not shown, of the lens mount. The flange 68 of the lens ring 66 is receivable in a counterbore 72, FIG. 5, provided adjacent a centrally located circular opening 74 in the mounting plate which serves to permit the lens ring thread to be inserted therethrough and into engagement with the corresponding thread of the lens mount 14.

It will be noted at this juncture that the screen 50 is provided with a centrally located, elliptical opening 76. Corresponding screens are illustrated in FIG. 7 of the drawings and incorporate such symbols as crosses, stars, keyholes, triangles and rectangles.

Figure 7:
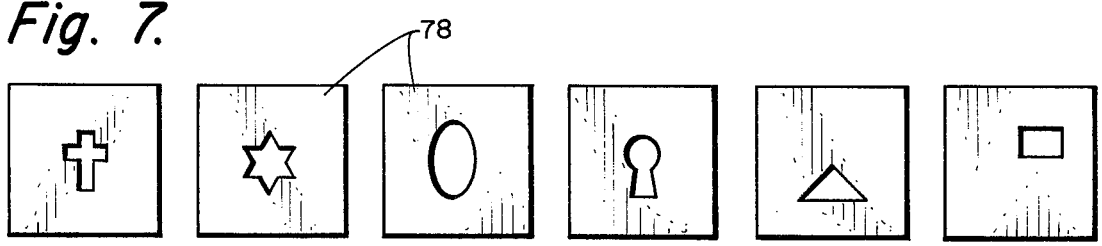
FIG. 7 illustrates the various types of vignetting screens which can be utilized in conjunction with the device of the invention.

It will, of course, be obvious to those skilled in the art that there is no limit to the variety of configurations, shapes and materials which can be utilized in the screens generally indicated at 78 in FIG. 7 of the drawings. It is, of course, desirable that the screens be fabricated from optical quality materials, such as polycarbonate, and that they be as durable as possible to permit the reuse thereof. In additional to being provided in a variety of configurations, the screens can be provided in a variety of optical characteristics, including completely transparent, textured transparent, opaque, reversal with transparent color blockout (double exposure) and reversal with opaque color blockout (double exposure) characteristics to achieve the desired artistic effects. Furthermore, the screens can be provided in a wide variety of colors which impart a colored overlay to the picture being taken.

Consequently, the professional and amateur photographer have available to them a wide variety of screens which will faciliate the achievement of unlimited artistic effects and which permit the photographer to be immediately cognizant of the effect that is going to be achieved when the negative is printed. Consequently, the photographer can experiment in the field with various desired effects ad can properly relate the selected image with the texture, density and color of the selected screen and with the vignette which is provided thereby.

Figure 3:
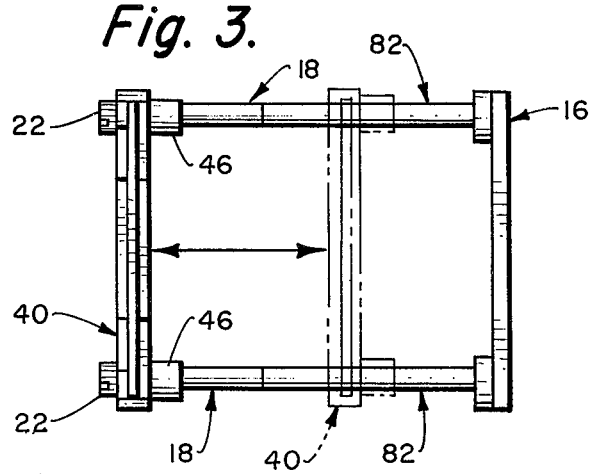
FIG. 3 is a view similar to FIG. 2 showing the utilization of track extension means in conjunction with the basic track means provided in conjunction with the device.

In order to permit the screen standard 40 to be moved further from the camera lens than the normal track means 18 will allow, track extender means 82, FIG. 3 and FIG. 9, are provided which cooperate with the track means 18 to materially elongate the path of travel of the screen standard 40 in relationship to the camera lens.

The track extender means 82, FIG. 9, is constituted by elongated cylindrical rods 84 having threaded bores 86 adapted to receive the correspondingly threaded inner extremities 24 of the track means 18 and having, themselves, threaded extremities 88 for demountable insertion in the associated track retainers 28.

Furthermore, the utilization of the track extender means 82 also permits the utilization, if desired, of an additional screen standard 40 which can be provided with an additional screen to achieve composite effects. The screen 40 illustrated in phantom in FIG. 3 of drawings may be considered to represent the utilization of such an additional screen or the alternative position of the screen 40 at the forward extremity of the track means 18.

An alternative embodiment of the vignetting device of the invention is shown in FIGS. 6 and 8–9 of the drawings and differs from the previously discussed embodiment in that the mounting plate 90 dispenses with the utilization of the conventional lens ring 66. This is accomplished by the provision, on the reverse or rear surface of the mounting plate of an integral, circular, threaded boss 92 which is juxtaposed to the centrally located opening 94 in the mounting plate 90. The threaded boss 92 provides a male thread 96 which is received in the corresponding internal thread 98 of the lens mount 14 so that the mounting plate can be screwed directly to the lens mount 14 and thus secured in operative relationship therewith without the need for the utilization of the conventional lens ring.

Operatively associated with the thread 96 of the mounting plate 90 is a lock ring 102 which incorporates an internal thread 104 permitting it to be mounted in operative engagement with the thread 96 on the circular boss 92 of the mounting plate 90.

After the thread 94 has been engaged in the corresponding thread 98 of the lens mount 14 the lock ring may be rotated to lock against the outer extremity of the lens mount and prevent inadvertent relative rotation of the mounting plate in relationship to the lens mount 14. To ensure against inadvertent rotation of the lock ring 102 a set screw 106 is provided in a bore 108 of the lock ring 102 to impinge upon the corresponding portion of the thread 94 and prevent inadvertent rotation of the lock ring 102. Of course, the width of the lock ring 102 is substantially less than that of the thread 94 on the boss 92 to permit it to be rotated thereupon.

From the description of the preferred embodiments appearing hereinabove, it will be apparent to those skilled in the art, both professional and amateur, that the vignetting device of the invention makes available a wide variety of artistic effects for use in the field which were previously achievable only in the photographic laboratory. As a matter of fact, the effects achieved by the photo-vignetting device of the present invention cannot be achieved in the photographic laboratory because they are incorporated into the negative of the image being taken simultaneously with the exposure of the film.

The results of such utilization of the various artistic effects achieved by the screens associated with the vignetting device of the invention in the field permits a spontaneity and a precision of effect to be achieved which cannot possibly be attained in the subsequent reexposure of the negative in the photographic laboratory.

I claim:

1. In a photo vignetting device for use in conjunction with a camera lens and mounted therefor while a photograph is being made, the combination of: a mounting plate having a centrally located circular opening coincident with and disposable adjacent said lens and adapted to receive securement means through said opening to secure said mounting plate to said lens mount adjacent said lens; track means having one end thereof mounted in said mounting plate; and a vignetting screen standard mounted for sliding movement on said track means, said vignetting screen standard having receptacle means therein for receiving said screen and including resilient track means sufficient to maintain said standard in a predetermined location on said track means but permitting intended movement thereupon.

2. A photo vignetting device of the character defined in claim 1 wherein said receptacle means of said standard has opposed resilient retention means associated therewith to facilitate the retention in said standard of a vignetting screen.

3. A photo vignetting device of the character claimed in claim 2 in which said screen standard incorporates resilient track engaging means for frictionally engaging said track means to maintain said standard in a selected position on said track means.

4. A photo vignetting device of the character claimed in claim 1 in which said track means includes track extender means permitting the location of said standard at a point more remote from said mounting plate than is possible with said track means.

5. A photo vignetting device of the character defined in claim 1 wherein said track means comprises a plurality of elongated rods extending substantially perpendicularly from said mounting plate, and said resilient track engaging means comprises a plurality of apertures in said vignetting screen standard through which said respective rods pass and at least one resilient frictionally engaging finger securely engaging the perimeter of at least one of said rods sufficient to maintain said standard in a predetermined location on said rods but permitting intended movement thereupon.

6. A photo vignetting device of the character defined in claim 5 wherein said elongated rods are cylindrical and a plurality of bifurcated, frictionally engaging fingers securely engage the perimeter of each of said rods.

7. A photo vignetting device of the character defined in claim 1 wherein said vignetting screen standard comprises an elongated base member and a pair of spaced elongated members extending substantially perpendicularly from said base member forming an open ended frame, lug means extending inwardly of said members and arranged in two spaced parallel planes forming a recessed track between the lug means of the two planes whereby said screen may be slipped into said recessed track through the open end of said frame and resilient means mounted on the lug means in one of said planes for pressing against said screen in a direction towards the other of said planes to retain said screen in said track.

* * * * *